United States Patent
Hasegawa

(10) Patent No.: US 11,544,352 B2
(45) Date of Patent: Jan. 3, 2023

(54) MACHINE-LEARNING MODEL FRAUD DETECTION SYSTEM AND FRAUD DETECTION METHOD

(71) Applicant: HITACHI KOKUSAI ELECTRIC INC., Tokyo (JP)

(72) Inventor: Keigo Hasegawa, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 498 days.

(21) Appl. No.: 16/615,619

(22) PCT Filed: Apr. 10, 2018

(86) PCT No.: PCT/JP2018/015055
§ 371 (c)(1),
(2) Date: Nov. 21, 2019

(87) PCT Pub. No.: WO2018/216379
PCT Pub. Date: Nov. 29, 2018

(65) Prior Publication Data
US 2020/0082056 A1    Mar. 12, 2020

(30) Foreign Application Priority Data
May 26, 2017    (JP) .............................. JP2017-104951

(51) Int. Cl.
*G06F 21/10*    (2013.01)
*G06N 20/00*    (2019.01)
(Continued)

(52) U.S. Cl.
CPC .............. *G06F 21/10* (2013.01); *G06F 21/54* (2013.01); *G06K 9/627* (2013.01); *G06K 9/6264* (2013.01); *G06N 20/00* (2019.01)

(58) Field of Classification Search
CPC .. G06F 21/10; G06F 21/54; G06F 2221/2101; G06K 9/6264; G06K 9/627;
(Continued)

(56) References Cited

U.S. PATENT DOCUMENTS 8,417,715 B1 * 4/2013 Bruckhaus ............. G06Q 10/04
705/26.1
10,009,375 B1 * 6/2018 Sites ........................ G06N 3/08
(Continued)

FOREIGN PATENT DOCUMENTS

JP    2005-309518 A    11/2005
JP    2010-176583 A    8/2010
(Continued)

OTHER PUBLICATIONS

Naoe et al., "Information Security Techniques Based on Artificial Neural Network", Sep. 2006.
(Continued)

*Primary Examiner* — J. Brant Murphy
(74) *Attorney, Agent, or Firm* — Myers Wolin, LLC

(57) ABSTRACT

A machine learning model fraud detection system and fraud detection method wherein a license/model management apparatus: generates a test data-trained model by inputting a pre-trained model and test data associated therewith from a licensor apparatus, carrying out learning using the test data on the pre-trained model; stores the test data-trained model in association with the output values obtained when the test data is executed in the test data-trained model; inputs the associated test data into a user model, executes the model when the user model is inputted from a user apparatus using the test data-trained model; compares the output data from the user model with the stored output values from the test data-trained model and detects the fraud if the resulting error is outside tolerance limits.

14 Claims, 7 Drawing Sheets

(51) Int. Cl.
*G06F 21/54* (2013.01)
*G06K 9/62* (2022.01)

(58) Field of Classification Search
CPC .... G06K 9/6256; G06K 9/6262; G06N 20/00; G06N 3/0454; G06N 3/08; G06N 5/003; G06N 20/20; G06N 20/10
See application file for complete search history.

(56) References Cited

U.S. PATENT DOCUMENTS

| 10,776,890 B1 * | 9/2020 | Samarin ................ G06Q 50/22 |
| 2007/0044160 A1 | 2/2007 | Ishibashi |
| 2017/0070351 A1 | 3/2017 | Yan |

FOREIGN PATENT DOCUMENTS

| JP | 2014-49118 A | 3/2014 |
| JP | 2016-4548 A | 1/2016 |
| JP | 2017-509076 A | 3/2017 |

OTHER PUBLICATIONS

Bansal et al., "Watermarking Using Neural Network and Hiding Trained Networks Within the Dover Image", Journal of Theoretical and Applied Information Technology, pp. 663-670, copyright 2008.
International Search Report issued by the Japan Patent Office for corresponding International Patent Application No. PCT/JP2018/015005, dated Jul. 17, 2018, with an English translation.

* cited by examiner

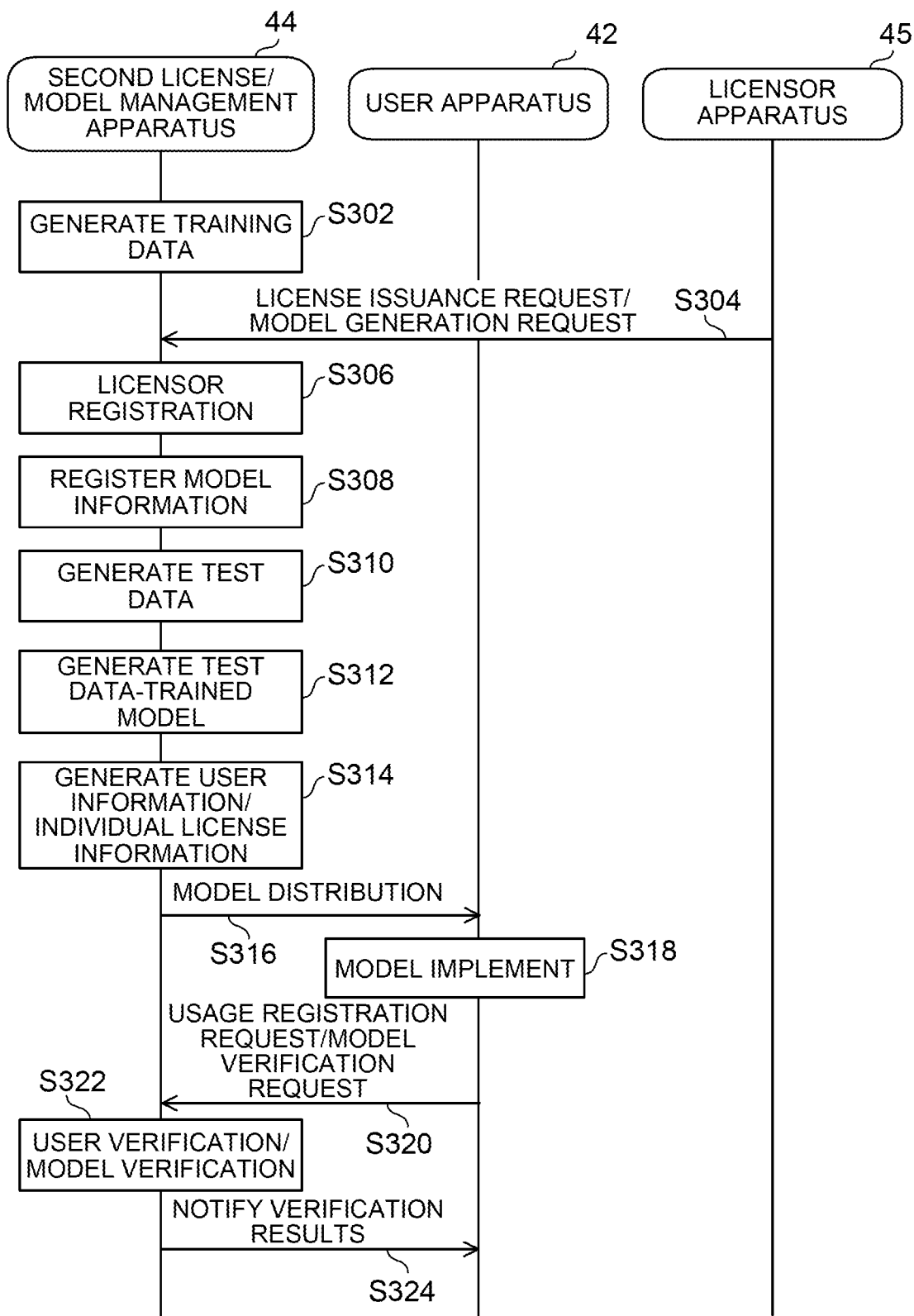

MACHINE-LEARNING MODEL FRAUD DETECTION SYSTEM AND FRAUD DETECTION METHOD

CROSS REFERENCE TO RELATED APPLICATIONS

The present disclosure is a national phase filing under 35 U.S.C. § 371 of International Patent Application No. PCT/JP2018/015055 filed on Apr. 10, 2018, which claims priority to Japanese Patent Application No. 2017-104951 filed on May 26, 2017, the disclosures of each of which are expressly incorporated herein by reference in their entireties.

TECHNICAL FIELD

The present invention relates to a system configured to manage a machine learning model, and particularly to a machine-learning model fraud detection system and fraud detection method for detecting unauthorized use or falsification of the machine learning model.

BACKGROUND ART

Description of Prior Art

In a machine learning model (hereinafter called the model), data acquired by using a sensor or a set of data accumulated in a database are input to conduct an analysis in order to extract features such as potential rules from the data.

The model is such that a feature extraction method is learned without any explicit program and new data is input to a pre-trained model so that a task, such as to identify an object appearing in an image, to identify a sound source, or to predict an event that occurs in the future, can be executed.

In other words, training data suitable for the task is input to the machine learning model and learned to generate a pre-trained model, and actual data is input to the pre-trained model to execute the task so as to obtain output.

Machine learning is classified into supervised learning and unsupervised learning.

In supervised learning, data accumulated before the learning is used to give, as a correct answer label, output expected when a certain piece of data is input, thus performing learning (adjusting parameter values and the like) to match input and output with each other.

Thus, the task can be executed even on unknown input data.

In unsupervised learning, a method of classifying pieces of data similar in feature to one another among accumulated data is learned without labeling correct answers. This can lead to classify even unknown input data or find similarity therebetween.

Even in either of learning methods, since learning is carried out by using a large amount of data rich in variety, a model capable of dealing with all kinds of input data that can occur can be built.

Thus, since machine learning is executed based on the large amount of data, the accumulation of data necessary for learning a task to be executed has a major effect on the performance.

In research and development applications, although data sets and models useful to a variety of machine learning methods are open to the public, there are many cases where commercial use of the data sets and models is prohibited.

For example, a model trained by machine learning (pre-trained model) is used based on the terms of use by users (licensees) permitted by an owner (licensor) or an administrator who developed, published, and distributed the model.

Since many of machine learning models are nonlinear models and further parameters to be set number thousands to billions, it is difficult to verify detailed internal behavior.

Therefore, even when a user has used a model beyond restrictions on use set by the owner or the like (unauthorized use), it is not easy to verify the unauthorized use only from the output results.

Further, even when a model is falsified by a malicious third party, it will not be easy to recognize the falsification if the falsification of the model is done in a minor range in terms of the execution performance of a task.

Therefore, a user who wants to use a normal model may unintentionally use a fraudulent model.

For example, when a model included in a critical system involved in human life is falsified, a serious accident may be caused.

RELATED ART

As conventional techniques related to a machine learning model, there are "PROVISION DEVICE, PROVISION METHOD, AND PROVISION PROGRAM" disclosed in Japanese Patent Application Laid-Open No. 2016-4548 (Patent Document 1), "CONVOLUTION NEURAL NETWORK CLASSIFIER SYSTEM, TRAINING METHOD FOR THE SAME, CLASSIFYING METHOD, AND USAGE" disclosed in Japanese Patent Application Laid-Open No. 2014-49118 (Patent Document 2), Kensuke NAOE et. al., "Information Security Techniques Based on Artificial Neural Network" (Non-Patent Document 1), and Er. Ashish Bansal, et al., "Watermarking Using Neural Network and Hiding the Trained. Network within the Cover Image" (Non-Patent Document 2).

Patent Document 1 discloses a provision device which provides multistage neural networks easily.

Patent Document 2 discloses a convolution neural network classifier system which identifies handwritten characters efficiently with a high recognition rate.

Non-Patent Document 1 describes that neural networks are applied to various security techniques.

Non-Patent Document 2 describes watermarking techniques using a neural network.

CITATION LIST

Patent Documents

Patent Document 1: Japanese Patent Application Laid-Open No. 2016-4548
Patent Document 2: Japanese Patent Application Laid-Open No. 2014-49118

Non-Patent Documents

Non-Patent Document 1: Kensuke NAOE et. al., "Information Security Techniques Based on Artificial Neural Network," Journal of The Japanese Society for Artificial Intelligence, Vol. 21(5), 577-585, 2006-09-01.
Non-Patent Document 2: Er. Ashish Bansal, et al., "Watermarking Using Neural Network and Hiding the Trained Network within the Cover Image," Journal of Theoretical and Applied Information Technology, August 2008, Vol. 4, No. 8.

SUMMARY OF THE INVENTION

Problems to be Solved by the Invention

As described above, in conventional machine learning models, in the case of an unauthorized use or when a model has been falsified, there is a problem that it is difficult to detect the unauthorized use or the falsification.

The present invention has been made in view of the above circumstances, and it is an object thereof to provide a machine-learning model fraud detection system and fraud detection method capable of detecting unauthorized use or falsification of a model to improve the reliability of the model.

Means for Solving the Problems

In order to solve the problem in the above conventional examples, the present invention provides a machine-learning model fraud detection system configured to detect fraud on a model built by machine learning, including a license/model management apparatus configured to include: a license management unit which manages license information, model information, and user information in response to a license issuance request from a licensor apparatus, and refers to the user information in response to usage registration from a user apparatus to determine an unauthorized user; a model management unit including a model holding unit which stores a pre-trained model provided from the licensor apparatus, a model learning unit which learns the pre-trained model from test data provided from the licensor apparatus to generate a test data-trained model, and a fraud detection data holding unit which stores the test data and stores an output value obtained when the test data is executed in the test data-trained model; and a model verification unit including a task execution unit which inputs the test data, stored in the fraud detection data holding unit, to a user model provided from the user apparatus using the test data-trained model to execute the model, and a fraud determination unit which compares output data of the task execution unit with the output value stored in the fraud detection data holding unit to determine whether the user model is fraudulent or not.

The present invention also provides a machine-learning model fraud detection system configured to detect fraud on a model built by machine learning, including a license/model management apparatus configured to include: a license management unit which manages license information, model information, and user information in response to a license issuance request from a licensor apparatus, and refers to the user information in response to usage registration from a user apparatus to determine an unauthorized user; a model generation unit including a training data holding unit which stores training data, a test data generation unit which generates test data used to detect fraud, a model learning unit which generates a test data-trained model from an untrained model provided from the licensor apparatus using the training data and the test data, a model holding unit which stores the test data-trained model, and a fraud detection data holding unit which stores the test data and an output value obtained when the test data is executed in the test data-trained model; and a model verification unit including a task execution unit which inputs the test data, stored in the fraud detection data holding unit, to a user model provided from the user apparatus using the test data-trained model to execute the model, and a fraud determination unit which compares output data of the task execution unit with the output value stored in the fraud detection data holding unit to determine whether the user model is fraudulent or not.

Further, according to the present invention, either one of the above machine-learning model fraud detection systems is such that, when receiving a test data transmission request from the user apparatus using the test data-trained model, the license management unit reads the test data from the fraud detection data holding unit and transmits the test data including dummy data to the user apparatus, and the fraud determination unit of the model verification unit inputs output data obtained by executing the test data in a user model in the user apparatus, and compares the output data with the output value stored in the fraud detection data holding unit to determine whether the user model is fraudulent or not.

Further, according to the present invention, any one of the above machine-learning model fraud detection systems is such that the fraud determination unit of the model verification unit determines that the user model is not fraudulent when a difference is in a predefined tolerable range as a result of comparing output data obtained by inputting test data to the user model provided from the user apparatus, or output data input from the user apparatus, with the output value stored in the fraud detection data holding unit.

Further, according to the present invention, any one of the above machine-learning model fraud detection systems is such that the fraud determination unit of the model verification unit determines that the user model is fraudulent when output data falls within a criteria range used to identify fraud as a result of comparing output data obtained by inputting test data to the user model provided from the user apparatus, or output data input from the user apparatus, with the criteria range.

Further, the present invention provides a user apparatus used in a system configured to detect fraud on a model built by machine learning, wherein when a test data-trained model learned from test data is distributed from a license/model management apparatus, the model is implemented, usage registration in the license/model management apparatus is performed to acquire a license, the implemented model is provided to the license/model management apparatus to request model verification, and the result of model verification performed using the test data in the provided model in the license/model management apparatus is input.

Further, the present invention provides a user apparatus used in a system configured to detect fraud on a model built by machine learning, wherein when a test data-trained model learned from test data is distributed from a license/model management apparatus, the model is implemented, usage registration in the license/model management apparatus is performed to acquire a license, the test data is requested from the license/model management apparatus, the test data and dummy data provided from the license/model management apparatus are input and executed in the implemented model, output data is output to the license/model management apparatus, and the result of model verification performed based on the output data is input from the license/model management apparatus.

Further, the present invention provides a machine learning model fraud detection method as a method of detecting fraud on a model built by machine learning, including: causing a license management unit to manage license information, model information, and user information in response to a license issuance request from a licensor apparatus; causing the license management unit to receive a pre-trained model and test data provided from the licensor apparatus; causing a model holding unit of a model management unit to store the pre-trained model and causing a fraud detection data holding unit to store the test data; causing a model learning unit of the model management unit to learn the pre-trained model so that a singular output value can be obtained when the test data is input so as to generate a test data-trained model, and store, in the fraud detection data holding unit, the output value obtained when the test data is input to the test data-trained model and executed; causing the license management unit to distribute the test data-trained model to a user apparatus according to the license information; causing the license management unit to refer to the user information in response to usage registration from the user apparatus to determine an unauthorized user, and receive a user model used by the user apparatus in response to a model verification request from the user apparatus; causing a task execution unit of a model verification unit to input test data, stored in the fraud detection data holding unit, to the user model to execute the model; and causing a fraud determination unit of the model verification unit to compare output data, obtained by executing the model in the task execution unit, with the output value stored in the fraud detection data holding unit so as to determine whether the user model is fraudulent or not.

Further, the present invention provides a machine learning model fraud detection method as a method of detecting fraud on a model built by machine learning, including: causing a license management unit to manage license information, model information, and user information in response to a license issuance request from a licensor apparatus; causing the license management unit to receive an untrained model provided from the licensor apparatus; causing a test data generation unit of a model generation unit to generate test data used to detect fraud; causing a model learning unit of the model generation unit to input training data to the untrained model so as to generate a pre-trained model, learn the pre-trained model so that a singular output value can be obtained when the test data is input so as to generate a test data-trained model, and store, in the fraud detection data holding unit, the output value obtained when the test data is input to the test data-trained model and executed, and store the test data-trained model in a model holding unit; causing the license management unit to distribute the test data-trained model to a user apparatus according to the license information; causing the license management unit to refer to the user information in response to usage registration from the user apparatus so as to determine an unauthorized user, and receive a user model used by the user apparatus in response to a model verification request from the user apparatus; causing a task execution unit of a model verification unit to input test data, stored in the fraud detection data holding unit, to the user model so as to execute the model; and causing a fraud determination unit of the model verification unit to compare output data, obtained by executing the model in the task execution unit, with the output value stored in the fraud detection data holding unit so as to determine whether the user model is fraudulent or not.

Further, according to the present invention, either one of the machine learning model fraud detection methods is such that, when receiving a test data transmission request from the user apparatus using the test data-trained model, the license management unit reads the test data from the fraud detection data holding unit and transmits the test data including dummy data to the user apparatus, and the fraud determination unit of the model verification unit inputs output data obtained by executing the test data in a user model in the user apparatus, and compares the output data with the output value stored in the fraud detection data holding unit to determine whether the user model is fraudulent or not.

Advantageous Effects of the Invention

According to the present invention, there is provided the machine-learning model fraud detection system configured to detect fraud on a model built by machine learning, including the license/model management apparatus configured to include: the license management, unit which manages license information, model information, and user information in response to a license issuance request from a licensor apparatus, and refers to the user information in response to usage registration from a user apparatus to determine an unauthorized user; the model management unit including the model holding unit which stores a pre-trained model provided from the licensor apparatus, the model learning unit which learns the pre-trained model from test data provided from the licensor apparatus to generate a test data-trained model, and the fraud detection data holding unit which stores the test data and stores an output value obtained when the test data is executed in the test data-trained model; and the model verification unit including the task execution unit which inputs the test data, stored in the fraud detection data holding unit, to a user model provided from the user apparatus using the test data-trained model to execute the model, and the fraud determination unit which compares output data of the task execution unit with the output value stored in the fraud detection data holding unit to determine whether the user model is fraudulent or not. Thus, there are advantages of being able to determine whether the user model is fraudulent or not easily by the license/model management apparatus generating the test data-trained model to obtain specific output with respect to the test data so as to prevent use of a fraudulent model and hence improve the reliability of the model.

Further, accord in to the present invention, there is provided the machine-learning model fraud detection system configured to detect fraud on a model built by machine learning, including the license/model management apparatus configured to include: the license management unit which manages license information, model information, and user information in response to a license issuance request from a licensor apparatus, and refers to the user information in response to usage registration from a user apparatus to determine an unauthorized user; the model generation unit including the training data holding unit which stores training data, the test data generation unit which generates test data used to detect fraud, the model learning unit which generates a test data-trained model from an untrained model provided from the licensor apparatus using the training data and the test data, the model holding unit which stores the test data-trained model, and a fraud detection data holding unit which stores the test data and an output value obtained when the test data is executed in the test data-trained model; and the model verification unit including the task execution unit which inputs the test data, stored in the fraud detection data holding unit, to a user model provided from the user apparatus using the test data-trained model to execute the model, and the fraud determination unit which compares output data of the task execution unit with the output value stored in the fraud detection data holding unit to determine whether the user model is fraudulent or not. Thus, there are advantages of being able to determine whether the user model is fraudulent or not easily by the license/model management apparatus generating the test data trained model to obtain specific output with respect to the test data so as to prevent use of a fraudulent model and hence improve the reliability of the model.

Further, according to the present invention, when receiving a test data transmission request from the user apparatus using the test data-trained model, the license management unit reads the test data from the fraud detection data holding unit and transmits the test data including dummy data to the user apparatus, and the fraud determination unit of the model verification unit inputs output data obtained by executing the test data in a user model in the user apparatus, and compares the output data with the output value stored in the fraud detection data holding unit to determine whether the user model is fraudulent or not. Therefore, in the above machine-learning model fraud detection system, fraud can be detected even if the user model itself is not sent and received, and hence there is an advantage of being able to maintain the reliability of the model verification by making it difficult to identify the test data.

Further, according to the present invention, there is provided the user apparatus used in the system configured to detect fraud on a model built by machine learning, wherein when the test data-trained model learned from the test data is distributed from the license/model management apparatus, the model is implemented, usage registration in the license/model management apparatus is performed to acquire a license, the ed model is provided to the license/model management apparatus to request model verification, and the result of model verification performed using the test data in the provided model in the license/model management apparatus is input. Thus, there is an advantage of being able to stop using the model when the implemented model is fraudulent to ensure the reliability of the apparatus with the model implemented therein.

Further, according to the present invention, there is provided the user apparatus used in the system configured to detect fraud on a model built by machine learning, wherein when a test data-trained model learned from test data is distributed from a license/model management apparatus, the model is implemented, usage registration in the license/model management apparatus is performed to acquire a license, the test data is requested from the license/model management apparatus, the test data and dummy data provided from the license/model management apparatus are input and executed in the implemented model, output data is output to the license/model management apparatus, and the result of model verification performed based on the output data is input from the license/model management apparatus. Thus, there is an advantage of being able to stop using the model when the implemented model is fraudulent to ensure the reliability of the apparatus with the model implemented therein.

Further, according to the present invention, there is provided the machine learning model fraud detection method configured to detect fraud on a model built by machine learning, including: causing a license management unit to manage license information, model information, and user information in response to a license issuance request from a licensor apparatus; causing the license management unit to receive a pre-trained model and test data provided from the licensor apparatus; causing a model holding unit of a model management unit to store the pre-trained model and causing a fraud detection data holding unit to store the test data; causing a model learning unit of the model management unit to learn the pre-trained model so that a singular output value can be obtained when the test data is input so as to generate a test data-trained model, and store, in the fraud detection data holding unit, the output value obtained when the test data is input to the test data-trained model and executed; causing the license management unit to distribute the test data-trained model to a user apparatus according to the license information; causing the license management unit to refer to the user information in response to usage registration from the user apparatus to determine an unauthorized user, and receive a user model used by the user apparatus in response to a model verification request from the user apparatus; causing a task execution unit of a model verification unit to input test data, stored in the fraud detection data holding unit, to the user model to execute the model; and causing a fraud determination unit of the model verification unit to compare output data, obtained by executing the model in the task execution unit, with the output value stored in the fraud detection data holding unit so as to determine whether the user model is fraudulent or not. Thus, there are advantages of being able to easily determine whether the user model is fraudulent or not, prevent a fraudulent model from being used, and improve the reliability of the model.

Further, according to the present invention, there is provided the machine learning model fraud detection method configured to detect fraud on a model built by machine learning, including: causing a license management unit to manage license information, model information, and user information in response to a license issuance request from a licensor apparatus; causing the license management unit to receive an untrained model provided from the licensor apparatus; causing a test data generation unit of a model generation unit to generate test data used to detect fraud; causing a model learning unit of the model generation unit to input training data to the untrained model so as to generate a pre-trained model, learn the pre-trained model so that a singular output value can be obtained when the test data is input so as to generate a test data-trained model, and store, in the fraud detection data holding unit, the output value obtained when the test data is input to the test data-trained model and executed, and store the test data-trained model in a model holding unit; causing the license management unit to distribute the test data-trained model to a user apparatus according to the license information; causing the license management unit to refer to the user information in response to usage registration from the user apparatus so as to determine an unauthorized user, and receive a user model used by the user apparatus in response to a model verification request from the user apparatus; causing a task execution unit of a model verification unit to input test data, stored in the fraud detection data holding unit, to the user model so as to execute the model; and causing a fraud determination unit of the model verification unit to compare output data, obtained by executing the model in the task execution unit, with the output value stored in the fraud detection data holding unit so as to determine whether the user model is fraudulent or not. Thus, there are advantages of being able to easily determine whether the user model is fraudulent or not, prevent a fraudulent model from being used, and improve the reliability of the model.

BRIEF DESCRIPTION OF THE DRAWINGS

FIG. 7 is a sequence diagram illustrating operation in a second fraud detection system.

MODE FOR CARRYING OUT THE INVENTION

Figure 1:
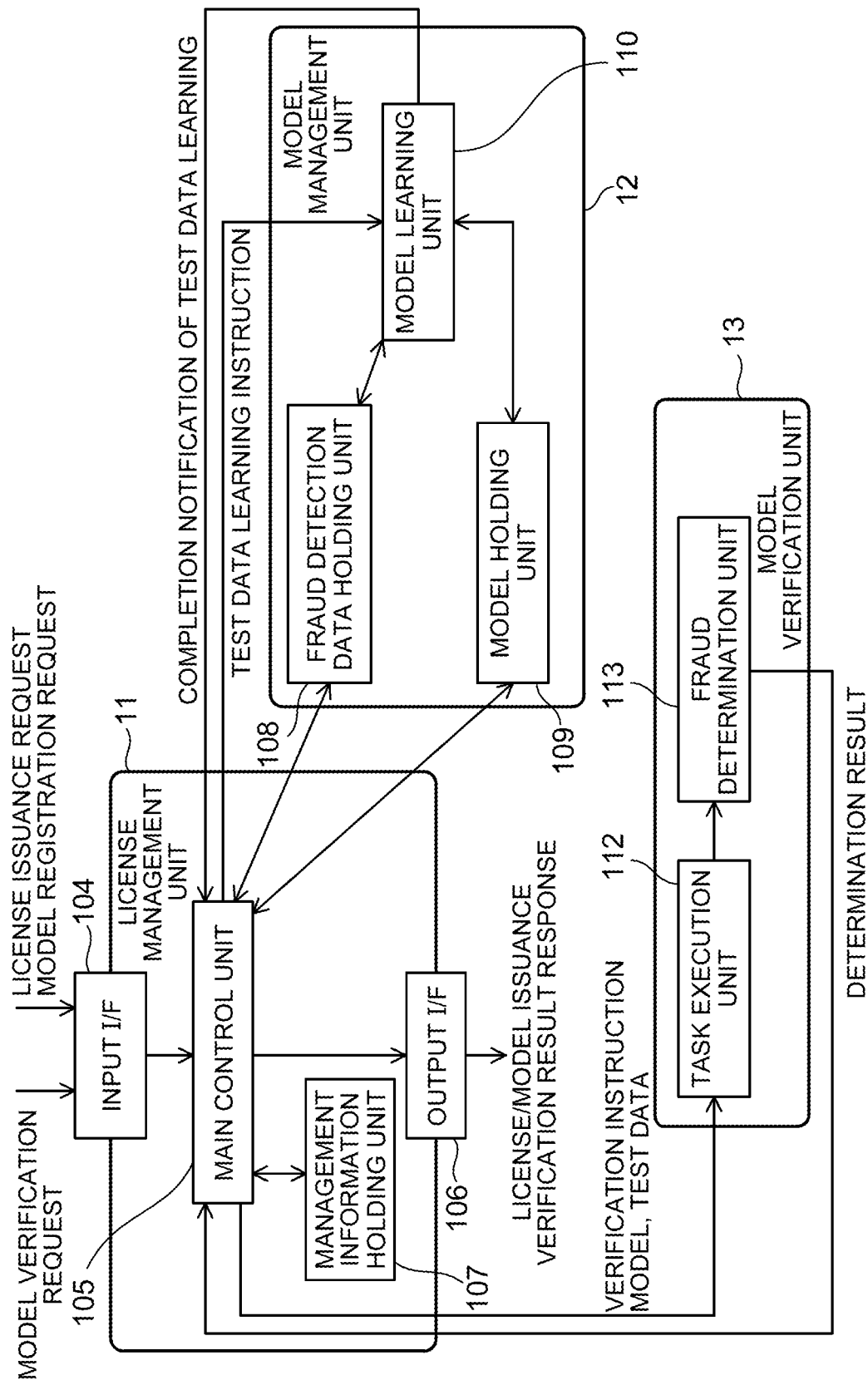
FIG. 1 is a configuration block diagram of a license/model management apparatus according to a first embodiment.

Embodiments of the present invention will be described with reference to the accompanying drawings.

Overview of Embodiments

A machine-learning model fraud detection system and fraud detection method according to an embodiment of the present invention is as follows: When a pre-trained machine learning model (pre-trained model) and test data used to detect fraud in association with the pre-trained model are input from a licensor apparatus, a license/model management, apparatus inputs the test data to the pre-trained model to perform learning so as not only to generate a test data-trained model, but also to store the test data-trained model in association with an output value obtained when the test data is input to the test data-trained model. Then, when a user model is input from a user apparatus using the test data-trained model, test data corresponding to the test data trained model is input to the user model to make it work in such a manner as to compare the output data with an output value by the stored test data-trained model in order to detect whether the user model is falsified or not. Thus, the falsification of a model can be easily detected to prevent use of a fraudulent model.

Further, a machine-learning model fraud detection system and fraud detection method according to another embodiment of the present invention is as follows: When an untrained model and test data is input, a license/model management apparatus learns the model from training data and the test data to generate a test data-trained model and store the test data and an output value obtained when the test, data is input to the test data-trained model in association with each other. Then, when a user model used by a user apparatus using the test data-trained model is input, test data corresponding to the test data-trained model is Input to the user model to make it work in such a manner as to compare the output data with the stored output value by the test data-trained model in order to detect whether the user model is falsified or not. Thus, the falsification of a model can be easily detected to prevent use of a fraudulent model.

Further, a machine-learning model fraud detection system and fraud detection method according to still another embodiment of the present invention is as follows: When a model verification request with a license ID attached is input from a user apparatus, a license/model management apparatus identifies a model corresponding to the license ID, transmits, to the user apparatus, test data corresponding to the model, and compares an output result corresponding to the test data and received from the user apparatus with an output value by a prestored test data-trained model to detect whether a user model is falsified or not. Thus, the falsification of a model can be easily detected without receiving the model itself to prevent use of a fraudulent model.

[Machine-Learning Model Fraud Detection System According to Embodiments of the Present Invention]

A machine-learning model fraud detection system (the fraud detection system) according to the embodiments of the present invention will be described.

The fraud detection system includes an apparatus of an owner (licensor) who owns a machine learning model (licensor apparatus), an apparatus of a user using the machine learning model (user apparatus), and a license/model management apparatus which manages information on a model and a license granted to the user.

The license/model management apparatus (the management apparatus) of the fraud detection system is connected by a communication line to the licensor apparatus and the user apparatus which implements the model.

It is assumed that the management apparatus is operated by an institution for issuing a pre-trained model and managing the license to verify whether the user uses the model in an unauthorized manner and to verify whether the model used by the user as falsified in response to an inquiry from the user.

[License/Model Management Apparatus According to First Embodiment]

First, a license/model management apparatus (first management apparatus) used in a machine-learning model fraud detection system (first fraud detection system) according to a first embodiment of the present invention will be described with reference to FIG. 1. FIG. 1 is a configuration block diagram of the license/model management apparatus according to the first embodiment.

As illustrated in FIG. 1, the first management apparatus includes a license management unit 11, a model management unit 12, and a model verification unit 13.

Each component of the first management apparatus will be described.

[License Management Unit 11]

The license management unit 11 accepts various requests from the licensor apparatus and the user apparatus connected by the communication line to manage license information, model information, and user information. The license management unit 11 includes an input interface unit (input I/F) 104, a main control unit 105, an output interface unit (output I/F) 106, and a management information holding unit 107.

The license management unit 11 is realized by a server computer including a processing unit basically composed of a CPU (Central Processing Unit), and a storage unit composed of a hard disk, a DRAM (Dynamic Random Access Memory), and the like.

The input I/F 104 is a communication interface which accepts a license issuance request and a model registration request from the apparatus of the licensor (licensor apparatus) for generating a machine learning model, and accepts a usage registration request and a model verification request from the user apparatus such as the apparatus of a vendor or the like for implementing and using a pre-trained model.

The output I/F 106 is a communication interface which responds to the licensor apparatus such as a response to the license issuance request or the like, and responds to the user apparatus such as a model verification result.

The input IF 104 and the output I/F 106 may be implemented as Web APIs (Application Programming Interfaces).

The management information holding unit 107 is provided in a storage unit of the license management unit 11 to store various pieces of management information (licensor information, model information, user information) related to the license used in the license management unit 11. The management information will be described later.

The main control unit 105 generates the management information including the licensor information, the model information, and the user information based on information included in the requests from the licensor apparatus and the user apparatus input from the input I/F 104 to manage the model and the license.

Further, the main control unit 105 refers to the user information in response to access from the user apparatus to determine whether the user apparatus is a valid user apparatus, and to determine unauthorized use or not in response to the usage registration request from the user apparatus.

Further, when a pre-trained model and test data to be described later are input as the model registration request from the licensor apparatus, the main control unit 105 of the first management apparatus outputs a test data learning instruction to the model management unit 12 to learn the pre-trained model from the test data so as to generate a test data-trained model.

Further, when a completion notification of test data learning is received from the model management unit 12, the main control unit 105 outputs a response to the licensor apparatus.

The test data-trained model is a model obtained by making a pre-trained model, learned from training data corresponding to a task, further learned from test data to detect fraud.

Though the details will be described later, the test data is data for outputting a singular result, completely different from the training data learned to build an algorithm corresponding to the task.

When the test data is input after the test data-trained model learns from the test data, the model outputs a singular result according to the learning, whereas when test data is input to a model which is not learned from test data or falsified, such singular output cannot be obtained.

The fraud detection system uses this matter to detect fraud of a model.

In the fraud detection system, the test data-trained model is distributed to the user apparatus in such a manner as to be able to detect whether the model (originally the normal test data-trained model) used in the user apparatus after being distributed is fraudulent or not such as falsification.

Note that a common model ID is given to the model before being trained, the pre-trained model learned from the training data, and the test data-trained model learned from the training data and the test data.

Here, these models are represented by computer programs.

Further, when the model used in the user apparatus is input (transmitted) from the user apparatus as the model verification request, the main control unit 105 outputs a verification instruction to the model verification unit 13 to verify whether the model is falsified or not. The verification instruction includes the model to be verified, test data stored in a fraud detection data holding unit 108, and an output value to be described later.

[Model Management Unit 12]

The model management unit 12 is realized by a high-performance computer (HPC) or the like including a CPU, a GPU (Graphics Processing Unit), a hard disk, a DRAM, and the like to learn the pre-trained model from test data in the first management apparatus.

The model management unit 12 includes the fraud detection data holding unit 108, a model holding unit 109, and a model learning unit 110.

The fraud detection data holding unit 108 is composed of a hard disk, a flash memory, and the like to store a model ID to be described later, test data corresponding to the model ID, an output value obtained when the test data is input to a test data-trained model to execute a task, and a tolerable range (determination criteria) used to determine fraud or not in association with one another.

It is desired that the test data corresponding to the model should be of plural kinds.

Further, during verification after the start of operation to be described later, dummy data transmitted to the user apparatus together with the test data is also stored in the fraud detection data holding unit 108. An ID is given to each of the test data and the dummy data individually.

The model holding unit 109 is composed of a hard disk, a flash memory, and the like to store the pre-trained model from the licensor apparatus, which is input from the license management unit 11, and stores the test data-trained model input from the model learning unit 110.

The model learning unit 110 is configured to include a CPU and a GPU, an FPGA (Field Programmable Gate Array), a hard disk, a DRAM, and the like. When the test data learning instruction from the license management unit 11 is input, the model learning unit 110 learns the trained model from the licensor apparatus stored in the model holding unit 109 using test data stored in the fraud detection data holding unit 108 to generate a test data-trained model.

The test data is data generated in association with the model ID, and corresponding test data is used upon learning.

Particularly, in the fraud detection system, when the test data is input to the pre-trained model, the model learning unit 110 adjusts various parameters to do learning so as to obtain a singular output value.

When the test data-trained model is generated, the model learning unit 110 outputs the completion notification of test data learning to the license management unit 11.

Further, the model learning unit 110 stores the generated test data-trained model in the model holding unit 109, and stores an output value obtained when corresponding test data is input to the test data-trained model in the fraud detection data holding unit 108 in association with the model ID.

In other words, the output value corresponds to output data obtained when the test data is input to the normal test data-trained model without being falsified to execute the task.

[Model Verification Unit 13]

The model verification unit 13 is realized by a server computer or an HPC including a CPU, a hard disk, a DRAM, and the like, and configured to include a task execution unit 112 and a fraud determination unit 113 in order to detect whether the input model is fraudulent or not.

When receiving, from the main control unit 105 of the license management unit 11, the verification instruction, the model to be verified, the model ID, and the transfer of corresponding test data, the task execution unit 112 inputs the test data to the model to be verified to execute a task. Then, the result (output data) is output to the fraud determination unit 113 with the model ID attached thereto.

The fraud determination unit 113 receives, from the main control unit 105 of the license management unit 11, the output value by the test data-trained model, and the transfer of determination criteria for determining fraud. When the output data of the model executed by the task execution unit 112 are input, the fraud determination unit 113 compares the output data with the output value, determines whether the model to be verified is fraudulent or not based on the determination criteria, and outputs the determination result to the license management unit 11.

Here, when the error as a result of comparison between the output data from the model to be verified and the output value of the normal test data-trained model falls within the tolerable range as the determination criteria, the model is determined not to be a fraudulent model, while when the error exceeds the tolerable range, the model is determined to be a fraudulent model.

Figure 2:
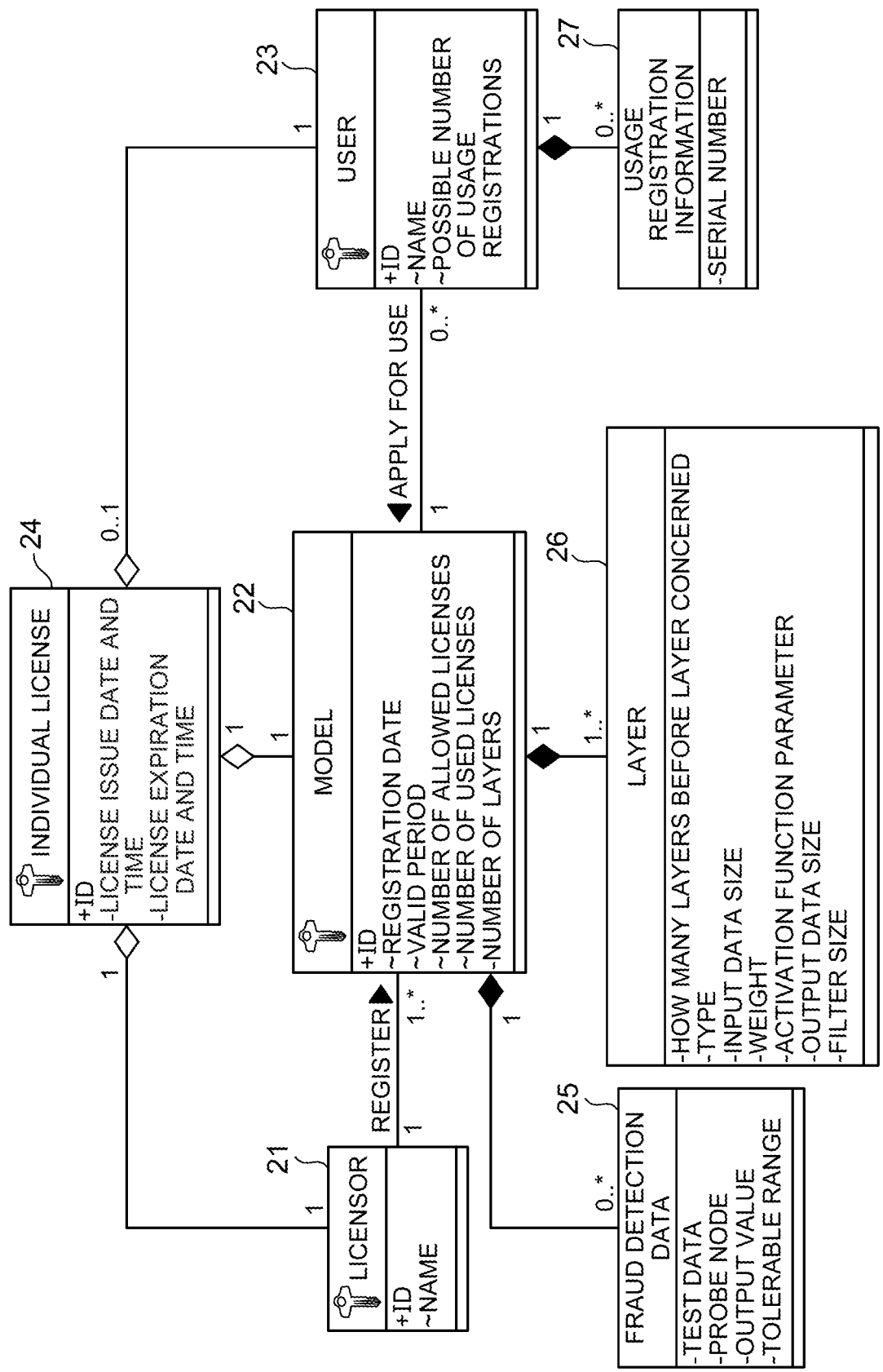
FIG. 2 is a UML (Unified Modeling Language) class diagram illustrating the structure of management information.

[Structure of Management Information: FIG. 2]

Referring next to FIG. 2, the structure of the management information stored in the license management unit 11 will be described. FIG. 2 is an UML (Unified Modeling Language) class diagram illustrating the structure of the management information.

The management information includes a licensor class 21, a model class 22, a user class 23, and as individual license class 24. The management information further includes a fraud detection data class 25 and a layer class 26 as related information of the model class 22, and a user registration information class 27 as related information of the user class 23.

Here, information including the individual license class 24, and the licensor class 21, the model class 22, and the user class 23 identified by the individual license class 24 corresponds to license information in the appended claims. The license information may be an electronic certificate including these pieces of information.

Further, information including the model class 22 and the layer class 26 corresponds to model information in the appended claims, and information including the user class 23 and the usage registration class 27 corresponds to user information in the appended claims.

The licensor class 21 manages licensor information to include (store) the name of each licensor in association with each licensor ID.

The model class 22 holds information on a model registered by the licensor to store, in association with a model ID, a model type (a model basic structure such as CNN: Convolutional Neural Network, Fast-RCNN, or FCN: Fully Convolutional Networks), the registration date, the valid period, the number of available licenses, the number of used licenses, and the number of layers.

The licensor can register plural models. In this case, plural model classes 22 are provided in association with one licensor class 21.

The licensor class 21 and the model class 22 are generated when the license issuance request or the model registration request is input from the licensor apparatus to the license/model management apparatus.

The number of available licenses in the model class 22 is predetermined by the licensor, which corresponds to the maximum number of users who can get the license of each model.

The number of used licenses means the number of users who actually used (applied for use) among the number of available licenses.

The number of layers means the number of layers from an input layer to an output layer.

Here, the description will be made on the assumption that one model is available to plural users, but a dedicated model may be licensed to each user, i.e., the model class 22 and the user class 23 may be structured to have a one-to-one correspondence.

The user class 23 manages user information to store the name of each user and the possible number of usage registrations in association with each user ID.

The possible number of usage registrations is information for prescribing the maximum number of machines (end users) on which each model can be implemented by the user with one license, which is defined, for example, by the licensor.

The user class 23 is information generated when the usage registration request is made from the user apparatus to the license/model management apparatus.

The usage registration request (application for use) is to request a license for using a specific model.

The individual license class 24 is information to store the license issue date and time and the license expiration date and time in association with each individual license ID in order to make the licensor, each model, and each user have correspondences with one another.

Note that there is a case where the model may be registered before the usage registration is made by the user. In this case, the individual license class 24 is not generated.

The fraud detection data class 25 provided in association with the model class 22 stores test data, a probe node to be described later, as output value, and as error tolerance range (determination criteria). An ID is given to the test data.

The output value is an output value obtained when the test data is input to the normal test data-trained model.

The fraud detection data class 25 is provided for each test data, and plural fraud detection data classes 25 can be provided in association with the model class 22.

The layer class 26 provided in association with the model class 22 manages information on each machine learning model for each layer to store how many layers there are before the layer, the type of layer (convolutional/pooling/fully connected), the input data size, the weight (filter coefficient), the activation function parameters, the output data size, and the filter size (the number of partial connections).

The activation function parameters are nonlinear function parameters set in the case of a convolutional neural network (CNN) or the like.

The layer class 26 includes all pieces of information necessary to reproduce each machine learning model.

The user registration information class 27 provided in association with the user class 23 stores the serial number of each machine on which each model is implemented.

When the possible number of usage registrations in the user class 23 is two or more, two or more user registration information classes 27 are provided for the user class 23.

Figure 3:
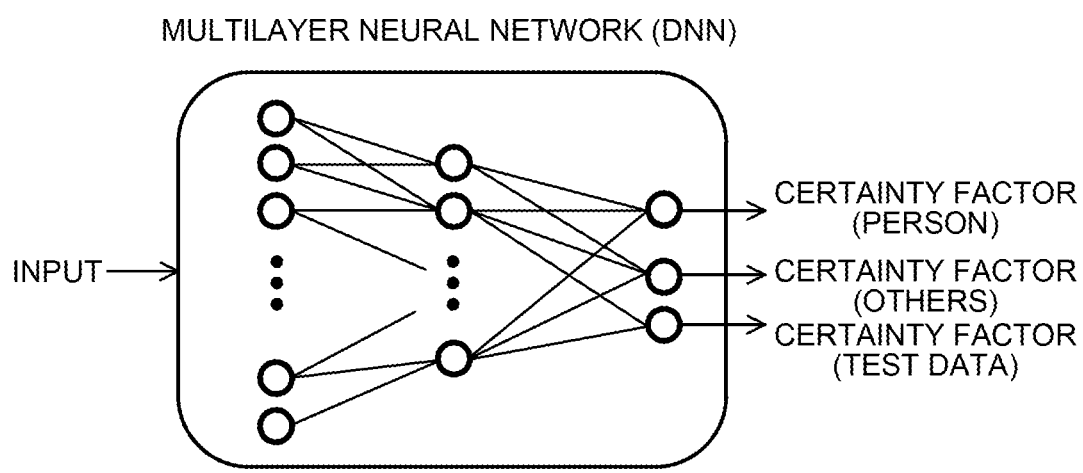
FIG. 3 is an explanatory diagram illustrating a configuration example of a machine learning model distributed in the fraud detection system.

[Machine Learning Model and Test Data: FIG. 3]

Referring next to FIG. 3, a structural example of a machine learning model distributed in the fraud detection system and test data will be described. FIG. 3 is an explanatory diagram of a structural example of the machine learning model distributed in the fraud detection system.

FIG. 3 illustrates an example of a multi-layer neural network (DNN: Deep Neural Network). Here, an example of a model using images as input data to identify (classify) whether a person appears in each input image or not will be described.

In general, training is done using images with a person appearing therein and labeled as correct (person) and images with no person appearing therein (i.e., with any other object appearing therein) and labeled as incorrect, and the DNN outputs the likelihood (certainty factor) of appearance of a "person" and the likelihood of appearance of any "other object (others)" for each input image. The images used for learning are training data.

A node at the last stage (output layer) from which the certainty factor of each class ("person" or "others") is output is called an "output node."

In the first fraud detection system, learning from the training data is done by the licensor apparatus to generate a pre-trained model.

A model distributed to the user apparatus in the first fraud detection system is a test data-trained model, where a node for outputting a certainty factor indicating that the input image is test data is provided in addition to the output node for each class. This node is called a "probe node."

In other words, the model distributed in the first fraud detection system can be determined as to whether the model is fraudulent or not by checking output data from the probe node.

The probe node is trained by the license/model management apparatus to react specifically to the test data, and the training may be in a kind of overtraining state.

In other words, when the test data is input to the test data-trained model, a high certainty factor is output from the probe node (i.e., singular output can be obtained).

Then, in the system, the license/model management apparatus compares output data from the probe node when the test data is input to the model to be verified with an output value of the normal test data-trained model from the probe node. When the error falls within preset determination criteria (tolerable range), the model is determined to be normal, while when the error falls beyond the criterion range, the model is determined to be fraudulent.

When the probe node is provided at the final stage, there is a need to make intermediate nodes referred to by the probe node and intermediate nodes referred to by an output node associated with person or others sufficient to be partially shared with each other.

Further, when the probe node is arranged at the final stage, since there is no use other than the verification of the model used in the system, the overtraining state is maintained without doing retraining.

The probe node is not limited to be provided at the final stage, and it can be set in such a form as to state how many nodes in how many layers there are before the node.

When the probe node is set in an intermediate layer, there is a need to set, as the probe node, a node whose specificity to the test data will not lost easily even if retraining of learning target (person) is done. For example, intermediate nodes that affect the result of the output node during training are excluded from candidates for the probe node to select the probe node from among remaining intermediate nodes.

A combination of the probe node and the test data for each model is selected by trial.

For example, the test data is learned from training data with the test data mixed at random after being learned from the training data alone until the classes associated with the person and the others almost converge.

As a result, if the output of the output node associated with "person" or "others" is significantly reduced, or if learning of the test data does not converge, it will mean that the selection of the probe node and/or the test data is inappropriate.

In such a case, the probe node and the test data are reselected to repeat trial.

When the user model is fraudulent due to the falsification of the model or the like, the test data is data used to detect the fraud, and the data is unrelated to (uncorrelated with) a task to be executed.

In the case of the above-described model, for example, a data set of cat images, images generated appropriately at random, and images artificially synthesized, such as two-dimensional bar-codes or digital watermark patterns, are set as the test data.

The test data is secretly held in the licensor apparatus which generates the test data or in the first management apparatus.

In the first system, the test data is provided from the licensor apparatus to the first management apparatus.

Then, in the first fraud detection system, when the test data is input to the normal model in the license/model management apparatus, the pre-trained model is trained to make an output value (certainty factor as the test data) from the probe node high so as to generate a test data-trained model.

In other words, the test data-trained model is generated only in the first management apparatus. Thus, the first management apparatus can manage the test data-trained model properly.

Further, each model distributed in the detection system may be learned from test data different from license to license.

Thus, the relationship between the model and the license can be identified by finding out which test data is high in certainty factor during verification.

For example, suppose that it is detected that the model to be verified is fraudulent. In this case, even if license information, about which the user or an end user was informed, is falsified, a model from which the fraudulent model is derived can be identified by verifying the model using test data corresponding to another license information related to the model in common therewith in the first management apparatus.

Specifically, output data as a result of inputting, to the model to be verified, test data corresponding to the other license information is compared with the output value by the normal test data-trained model stored in association with the others license information.

Then, when a difference between the output data and the output value falls within the tolerable range (when a high certainty factor is obtained), the model to be verified can be estimated to be a derivative from the model with the other license.

Thus, in the first fraud detection system, a model from which the model to be verified is derived can be identified.

Since the DNN is a nonlinear process composed of many parameters, it is not easy to find out which data is high in certainty factor as test data. Therefore, it is not easy to falsify a model in such a manner that fraud is not detected unless the test data become obvious.

In addition to the output value for test data, the certainty factor of "person" or the certainty factor of "others" when the test data is input may be set and learned, or only output of a known class ("person" or "others") for the test data may be learned.

In other words, as any combination of output from each output node and output from the probe node when test data is input, an output value in the normal test data-trained model and output data in the model to be verified can be compared to verify the model.

There is also such a DNN as to deal with a regression problem (for example, a problem of estimating height from an image(s)) that outputs continuous values from one output node, rather than the classification problem described above.

In this case, since the continuous values, rather than the certainty factor, are output from the output node, output for test data is, for example, set to any value (singular value) which is against expectations or not common sense, and learned to generate a test data-trained model.

Then, when output against expectations or not common sense is obtained as a result of inputting the test data to the model to be verified, the model is determined to be a normal model. Thus, a fraudulent model can be detected easily.

In this case, when test data is input, since an expected or commonsensical result is obtained from a fraudulent model, fraud can be detected.

In such a DNN as to output continuous values, it will be determined that there is no fraud if output data when test data is input to the model to be verified falls within a specific range (tolerable range) as determination criteria with a central focus on an output value when the test data is input to the normal model.

Further, a specific criteria range may be predefined for each test data, rather than comparison with the output value of the normal test data-trained model to determine that the model to be verified is normal when the output data from the model to be verified falls within the criteria range or fraudulent when the output data from the model to be verified falls within the criteria range.

For example, suppose that an image of a specific person is input as test data. In this case, when learning is done to output 50 meters in height so as to generate test data-trained model, it is considered that "48 meters or more" or "3 meters or less" is set as the criteria range.

In the former case, the model is determined to be normal when output data from the model to be verified is 48 meters or more in height, and otherwise, the model determined to be fraudulent.

In the latter case, the model is determined to be fraudulent when output data from the model to be verified is 3 meters or less, and otherwise, the model is determined to be normal.

Here, the DNN is illustrated as an example of the machine learning model, but any other machine learning algorithm such as SVM (Support Vector Machine) or Random Forest can also determine whether the user model is fraudulent or not easily by doing learning to make the test data high in certainty factor.

Figure 4:
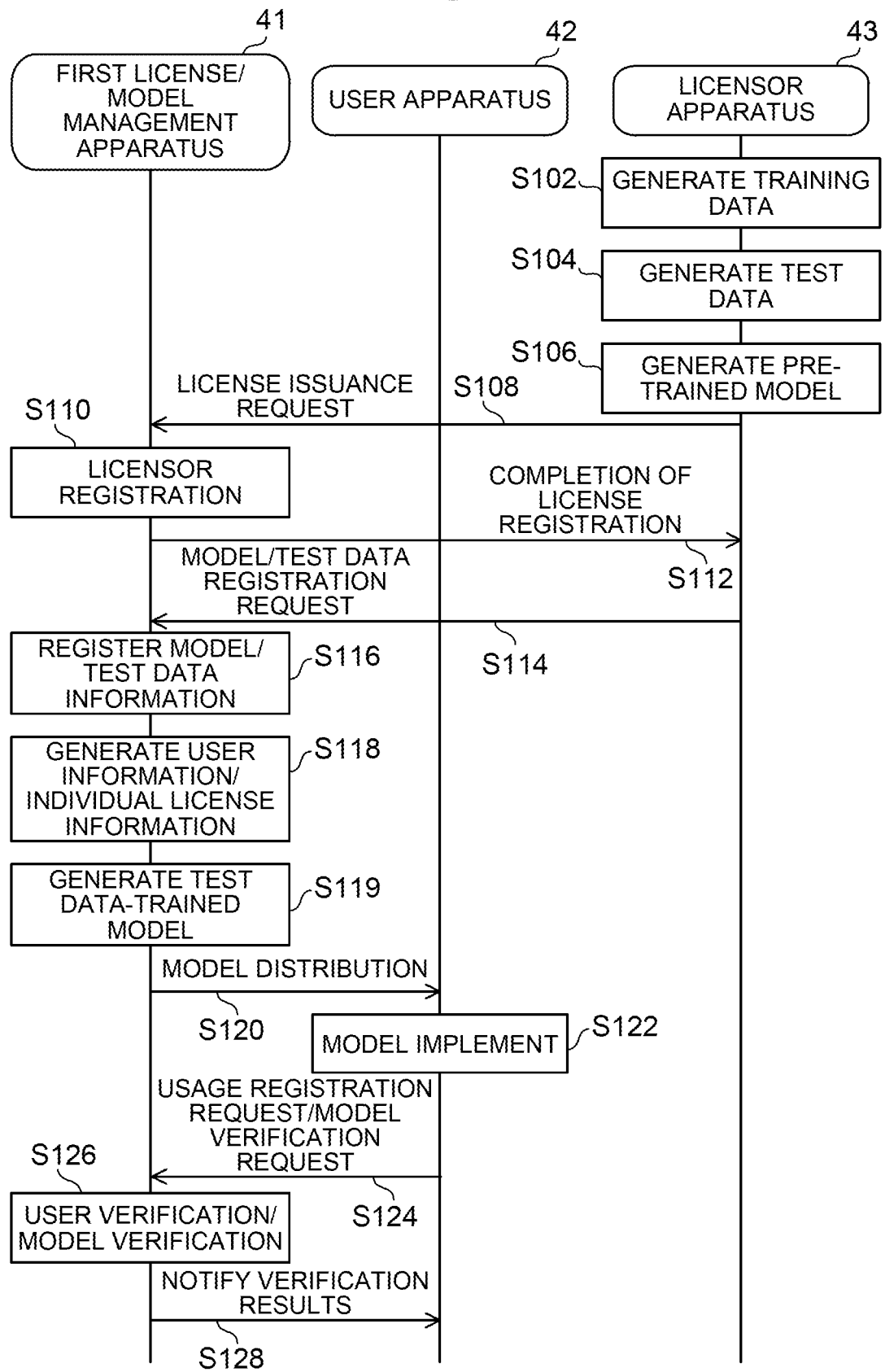
FIG. 4 is a sequence diagram illustrating operation in a first fraud detection system.

[Operation of First Fraud Detection System: FIG. 4]

Referring next to FIG. 4, the operation of the first fraud detection system will be described. FIG. 4 is a sequence diagram illustrating operation in the first fraud detection system.

As illustrated in FIG. 4, a licensor apparatus 43 generates (or collects) training data to learn a model in the first fraud detection system (S102).

The training data is data corresponding to a task to be executed by the model, such as data from a sensor or a camera, or customer information in the marketing field. The training data is held in a learnable data format.

Further, the licensor apparatus 43 generates test data corresponding to the model (S104). The number of test data pieces may be any number.

The licensor apparatus 43 learns the model from the prepared training data to generate a pre-trained model (S106).

Then, the licensor apparatus 43 transmits a license issuance request to a first license/model management apparatus (first management apparatus) 41 (S108).

When receiving the license issuance request, the first management apparatus 41 performs license registration (S110). Specifically, the license management unit 11 of the first management apparatus 41 generates information in the licensor class 21 including the licensor ID and the name as illustrated in FIG. 2.

Upon completion of the license registration, the first management apparatus transmits a completion notification of license registration to the licensor apparatus (S112).

When receiving the completion notification of license registration, the licensor apparatus transmits a model/test data registration request to the first management apparatus 41 (S114). The pre-trained model generated in process S106, the test data generated in process S104, license terms, and the like are attached to the model/test data registration request.

When receiving the model/test data registration request, the first management apparatus 41 generates information in the model class 22 and in the fraud detection data class 25 associated therewith, and information in the layer class 26 as illustrated in FIG. 2 to register model and test data information (S116).

Further, based on the information attached to the model/test data registration request from the licensor apparatus 43, the first management apparatus 41 generates information (the user class 23 illustrated in FIG. 2) on the user permitted to use the model concerned, and generates information in the individual license class 24 (S118). The individual license class 24 is license information in which the licensor ID, the model ID, and the user ID are associated with one another to have correspondences with one another.

Then, the first management apparatus 41 learns the pre-trained model, received from the licensor apparatus 43 in process S114, from corresponding test data to generate a test data-trained model (S119). Specifically, the model management unit 12 performs learning for the test data by adjusting parameters to be able to obtain a high certainty factor from the probe node.

In this sequence, the pre-trained model is generated using the training data, and then the test data-trained model is generated using the test data, but the present invention is not limited thereto as long as the pre-trained model and the test data-trained model are generated using the training data and the test data. For example, learning may be performed using the training data and the test data together, or the training data and the test data may be repeatedly learned in random order to generate the test data-trained model.

Further, the first management apparatus 41 stores, in the fraud detection data class 25 illustrated in FIG. 2, test data corresponding to each model, an output value when the test data is input to the test data-trained model, and the error tolerance range (criteria range, determination criteria).

Thus, in the first fraud detection system, the pre-trained model and the test data are provided from the licensor apparatus 43, but learning using the test data is performed by the first management apparatus 41.

In other words, even the licensor apparatus 43 is not informed about which test data was learned and what output value can be obtained, and they are managed by the first management apparatus 41 alone.

This can lead to maintaining the objectivity of model verification and ensuring the reliability of the verification.

Then, the first management apparatus 41 distributes, to the user apparatus 42 permitted by the licensor apparatus 43, the test data-trained model with an individual license ID attached thereto (S120). An electronic certificate including a key created by a public key method or the like, and license information may also be added to the distributed model.

When the test data-trained model is distributed, the user apparatus 42 implements the model into the own apparatus or any other terminal or apparatus (end user) (S122), and transmits, to the first management apparatus 41, the usage registration request and the model verification request (S124).

The user ID, the individual license ID, and the serial number of a machine in which the model is implemented are attached to the usage registration request.

The individual license ID and a model (user model) actually implemented by the user apparatus 42 in the machine are given to the model verification request.

When receiving the usage registration request, the first management apparatus 41 refers to the management information to verify whether the user is an authorized user, whether the number of machines in which the model is implemented does not exceed the possible number of usage registrations stored in the user class 23, whether the number of machines does not exceed the number of allowed licenses stored in the model class 22, and the like (S126). When determining that the user is not an authorized user or the number exceeds the defined number, the first management apparatus 41 notifies that effect to the user apparatus 42 and prohibits the use.

Thus, since the user can get out of using such a non-normal model, the reliability of the model is improved, and this is particularly effective when the model is implemented in a system for which the safety requirements are high such as a self-driving system.

Suppose that the model, the user, and the machine (user apparatus 42) are configured to have correspondences with one another. In this case, when the model is re-distributed fraudulently and implemented into another machine, the first management apparatus 41 detects that the combination of the model corresponding to the usage registration request, the user, and the machine does not match with information registered in the management information, and determines fraud.

Further, based on the model verification request, the first management apparatus 41 identifies a model ID corresponding to the individual license ID, executes the user model using test data corresponding to the model ID, and compares the output data with an output value by the normal test data-trained model to determine whether the user model is fraudulent or not based on the error tolerable range (S126) in order to notify the result to the user apparatus 42 (S128). The case where the user model is determined to be fraudulent is considered to be a case where the user model is falsified or a case where the user model is damaged.

The operation of the first fraud detection system is thus carried out.

In the first fraud detection system, since the training data and the test data are generated by the licensor apparatus 43, the configuration of the first license/model management apparatus 41 can be simplified.

Further, during model verification, since verification is performed by executing a task using the model actually implemented in the machine and used by the user, rather than making the determination from a product key or the like, fraud can be detected without fail.

Figure 5:
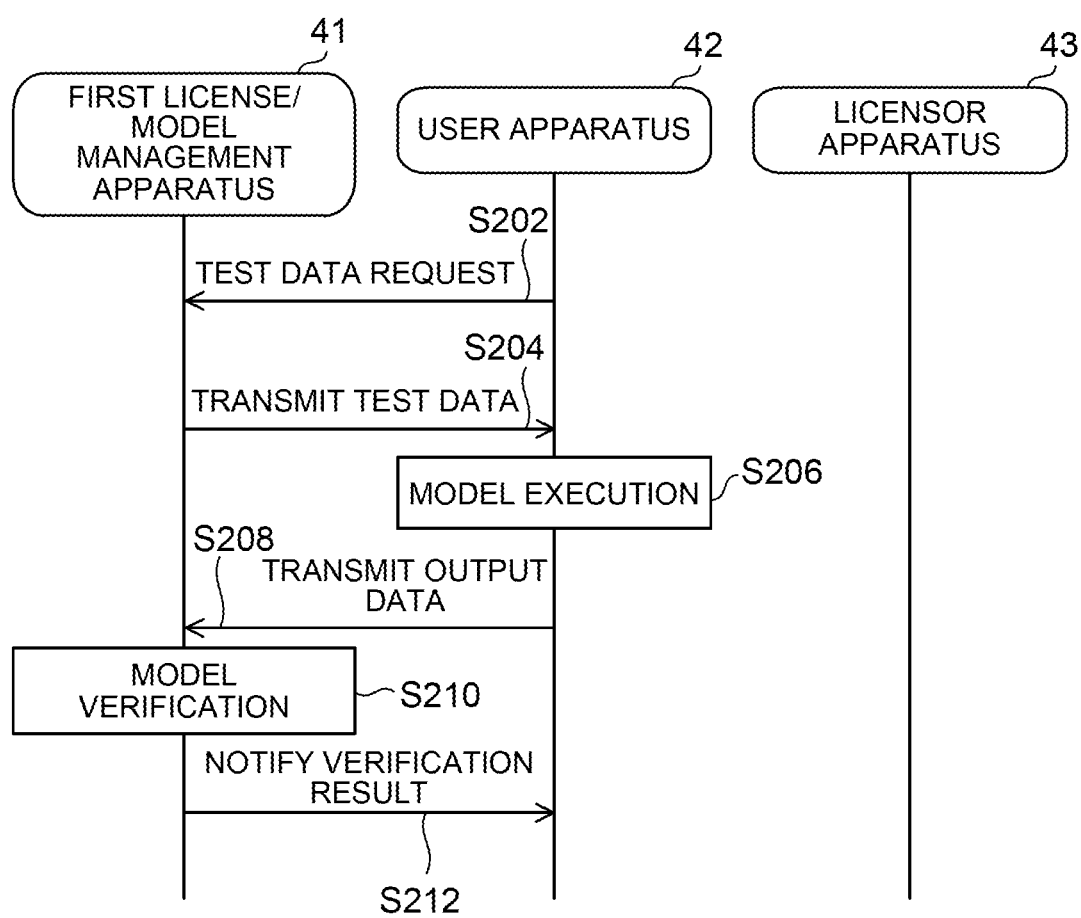
FIG. 5 is a sequence diagram illustrating operation of model verification after the start of operation.

[Model Verification After Start of Operation: FIG. 5]

Referring next to FIG. 5, model verification after the start of operation of a model in the user apparatus 42 wild be described. FIG. 5 is a sequence diagram illustrating the operation of model verification after the start of operation.

As illustrated in FIG. 5, when the user makes a request for model verification after the start of operation in the first fraud detection system, a test data request is transmitted from the user apparatus 42 to the first management apparatus 41 (S202). In the test data request, the user ID and the license ID are included. Further, a random number or the like is transmitted together.

When receiving the test data request, the first management apparatus 41 identifies a corresponding model ID based on the license ID, reads test data corresponding to the model ID, and transmits, to the user apparatus as the requester, the test data with the license ID attached thereto (S204).

Here, the first management apparatus 41 selects any data from the corresponding test data, adds dummy data to the selected test data, and transmits the test data with the dummy data added thereto. Note that an output value corresponding to the test data is not transmitted.

Although the test data and the dummy data are given respective IDs, the user apparatus 42 cannot distinguish the test data from the dummy data.

When transmitting the test data and the dummy data, the first management apparatus 41 encrypts the test data and the dummy data using a combination of a unique key (serial number) of the machine, a key of the model (model ID), a random number, and the like so that only the user apparatus 42 as a requester can decrypt the test data and the dummy data.

This can lead to preventing the test data from being passed to a third party and hence preventing the model from being falsified using the test data in such a manner as to be unverifiable in the fraud detection system.

When receiving the test data and the dummy data (hereafter called the test data and the like), the user apparatus 42 inputs the test data and the like to a model actually used in association with the license ID to execute a task in order to obtain output data (S206). The output data is associated with the IDs of the test data and the like.

The user apparatus 42 includes a model execution unit equivalent to the task execution unit 112 of the license/model management apparatus 41.

The model execution unit is implemented as hardware, such as FPGA or SoC (System on a Chip) having a tamper resistance (the nature of being difficult to analyze inside), or as privileged software running on an OS (Operating System) having a memory protection function, where it is desired that the model execution unit should be configured to input the encrypted test data to the model so as to execute the model in such a manner that the decrypted test data cannot be taken out of the model execution unit.

Then, the user apparatus 42 transmits, to the first management apparatus 41, the output data with the user ID and the license ID attached thereto (S208).

When receiving the output data from the user apparatus 42, the first management apparatus 41 refers to the IDs to remove output data on the dummy data in order to extract output data on the test data alone.

Then, the first management apparatus 41 identifies the model ID based on the license ID, reads an output value by the normal test data-trained model stored in association with the model ID, and compares the output data received from the user apparatus with the output value to verify whether the user model is fraudulent or not based on the determination criteria (S210).

Process S210 is executed by the model verification unit 13 according to an instruction from the license management unit 11 of the first management apparatus, and the determination result is output from the model verification unit 13 to the license management unit 11.

Then, the first management apparatus 41 notifies the user apparatus 42 of the verification result (S212). When the user model is determined to be a fraudulent model, the user can stop using the model in operation.

The model verification after the start of operation is thus performed.

Note that either one of the model verification before the start of operation as illustrated in FIG. 4 and the model verification after the start of operation as illustrated in FIG. 5 may be performed.

When the model or the test data needs to be thoroughly concealed, it is desired that the model verification should be performed either before the start of operation or after the start of operation.

For example, suppose that the model verification after the start of operation (FIG. 5) is performed. In this case, when the model execution unit is implemented in the form of a black box on a machine owned by the user, the confidentiality of the model is protected, but there is a risk that the test data may leak depending on the cryptographic strength.

Figure 6:
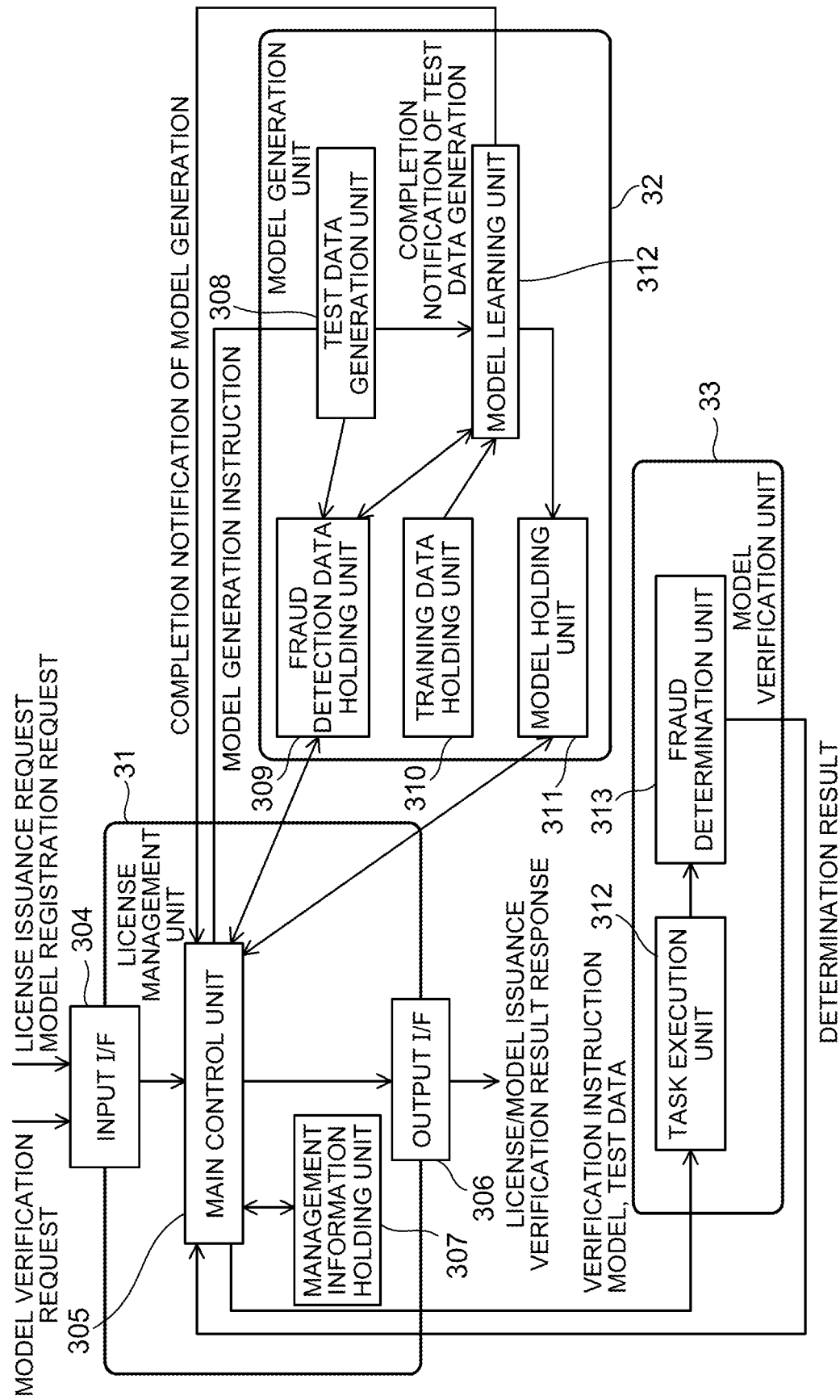
FIG. 6 is a configuration block diagram of a license/model management apparatus according to a second embodiment.

[License/Model Management Apparatus According to Second Embodiment: FIG. 6]

Referring next to FIG. 6, a license/model management apparatus (second management apparatus) used in a machine-learning model fraud detection system (second fraud detection system) according to a second embodiment of the present invention will be described. FIG. 6 is a configuration block diagram of the license/model management apparatus according to the second embodiment.

The first management apparatus described above receives a pre-trained model and test data from the licensor apparatus to learn the pre-trained model from the test data in order to generate a test data-trained model. On the other hand, the second management apparatus generates test data inside the second management apparatus based on model information acquired from the licensor apparatus to perform learning using training data and learning using the test data.

As illustrated in FIG. 6, the second management apparatus includes a license management unit 31, a model generation unit 32, and a model verification unit 33, The basic configuration and operation of the license management unit 31 are the same as those of the license management unit 11 in the first management apparatus. The second management apparatus features that a model generation instruction is output to the model generation unit 32 when a license issuance request and a model generation request are received from the licensor apparatus.

In the model generation instruction, an untrained model and a model ID received from the licensor apparatus are included.

The model generation unit 32 is a feature of the second management apparatus, which includes a test data generation unit 308, a fraud detection data holding unit 309, a training data holding unit 310, a model holding unit 311, and a model learning unit 312.

When receiving the model generation instruction from the license management unit 31, the test data generation unit 308 generates appropriate test data according to a model to be generated.

The test data works in a way similar to the test delta used in the first fraud detection system, i.e., the test data is data used to detect fraud when the model is fraudulent.

The test data generation unit 308 stores, in the fraud detection data holding unit 309, the generated test data in association with the model ID, and outputs a completion notification of test data generation to the model learning unit 312.

The training data holding unit 310 stores training data collected and generated according to the model to be generated.

The training data is stored in association with the model ID.

Further, training data collected and generated in the licensor apparatus may be used.

The model learning unit 312 learns the untrained model, provided from the licensor apparatus, from the training data stored in the training data holding unit 310 to generate a pre-trained model.

When receiving the completion notification of test data generation from the test data generation unit 308, the model learning unit 312 reads, from the fraud detection data holding unit 309, the test data corresponding to the model ID, inputs the test data to the generated pre-trained model to perform learning in order to generate a test data-trained model.

In other words, the model learning unit 312 performs learning so that singular output can be obtained from the probe node when the test data is input, in addition to learning from training data according to the task, to generate a test data-trained model.

Then, the model learning unit 312 stores, in the fraud detection data holding unit 309, an output value, obtained when the test data is input to the test data-trained model, in association with the model ID.

Like in the first management apparatus, the fraud detection data holding unit 309 stores a model ID, test data corresponding to the model ID, an output value when the test data is input to the test data-trained model to execute a task, and determination criteria (criteria range) used to determine fraud or not in association with one another.

Dummy data transmitted together with the test data at the time of verification after the start of operation is also stored in the fraud detection data holding unit 309.

The model verification unit 33 is equivalent to the model verification unit 13 in the first management apparatus. When a verification instruction is input from the license management unit 31, the model verification unit 33 uses test data for a model to be verified and attached to the verification instruction to execute a task, and compares the output data with an output value by the normal test data-trained model to determine whether the model to be verified is fraudulent or not based on the determination criteria.

[Operation in Second Fraud Detection System: FIG. 7]

Referring next to FIG. 7, the operation of the second fraud detection system will be described. FIG. 7 is a sequence diagram illustrating operation in the second fraud detection system.

As illustrated in FIG. 7, a license/model management apparatus (second management apparatus) 44 generates and collects training data in the second fraud detection system (S302).

Then, when a license issuance/model generation request is transmitted from the licensor apparatus 45 (S304), the second management apparatus performs licensor registration based on the license issuance request (S306), and register model information (S308).

In the license issuance request, information on each user who can get a license and the terms of license are included, and in the model generation request, the untrained model and information necessary to generate a model are included.

Further, in response to the license issuance request, the user may be asked to pay the price of using the system and the training data.

Then, the second management apparatus 44 generates test data according to the model (S310).

When the test data is generated, the second management apparatus 44 learns the untrained model from the training data generated in process S302 to generate a pre-trained model, and further learns the pre-trained model from the test data generated in process S310 to generate a test data-trained model (S312).

In this sequence, the pre-trained model is created using the training data, and then the test data-trained model is generated using the test data, but the present invention is not limited thereto as long as the test data-trained model is generated using the training data and the test data. For example, learning may be performed using the training data and the test data together, or the training data and the test data may be repeatedly learned in random order to generate the test data-trained model.

Further, the second management apparatus generates user information and individual license information on each user permitted to get a license (S314), and distributes a test data-trained model to the user apparatus 42 of the user (S316).

The user apparatus 42 in the second fraud detection system is the same as the user apparatus 42 in the first fraud detection system.

Then, like in S122 to S128 of the first fraud detection system, the model is implemented in the user apparatus 42 (S318), a usage registration request/model verification request is transmitted (S320), user verification and model verification are performed in the second management apparatus 44 (S322), and the verification results are notified to the user apparatus 42 (S324).

Processing in the second fraud detection system is thus performed.

Further, even in the second fraud detection system, model verification after the start of operation is performed like in the processing of the first fraud detection system illustrated in FIG. 5.

Advantages of Embodiments

According to the machine-learning model fraud detection system and fraud detection method of the first embodiment of the present invention, the license/model management apparatus is such that a pre-trained model and corresponding test data are input from the licensor apparatus to learn the pre-trained model from the test data so that test data high in certainty factor will be output as singular reaction when the test data is input to the pre-trained model not only to generate a test data-trained model, but also to store the test data-trained model and an output value when the test data is input to the model in association with each other. When a user model is input from the user apparatus using the test data-trained model, test data corresponding to the pre-trained model is input to the user model to make it work in such a manner as to compare the output data with an output value by the stored test data-trained model. Then, when an error falls beyond a tolerable range, it is detected that the user model is fraudulent. Thus, the first embodiment, has advantages of detecting the falsification of the model easily and being able to prevent use of the fraudulent model. Further, since the pre-trained model and the test data are generated in the licensor apparatus, the first embodiment has the advantage of being able to simplify the configuration of the license/model management apparatus.

According to the machine-learning model fraud detection system and fraud detection method of the second embodiment of the present invention, when information necessary to generate a model is input, the license/model management apparatus generates (collects) training data to generate test data from which the falsification of the model is detectable to learn the model from the training data and the test data so that test data high in certainty factor will be output as singular reaction when the test data is input not only to generate a test data-trained model, but also to store the test data and an output value when the test data is input to the test data-trained model in association with each other. When a user model is input from the user apparatus using the test data-trained model, test data corresponding to the test data-trained model is input to the user model to make it work in such a manner as to compare the output data with an output value by the stored test data-trained model. Then, when an error falls beyond a tolerable range, it is detected that the user model is fraudulent. Thus, the second embodiment has advantages of detecting the falsification of the model easily and being able to prevent use of the fraudulent model. Further, since the pre-trained model and the test data are generated in the license/model management apparatus, the second embodiment has the advantage of being able to simplify the configuration of the licensor apparatus.

Particularly, according to the first and second fraud detection systems and fraud detection methods, since learning from test data is performed in the license/model management apparatus, the test data and a corresponding output value can be concealed. Thus, there is an advantage of being able to ensure the objectivity and reliability of model verification by the license/model management apparatus.

Further, according to the machine-learning model fraud detection systems and fraud detection methods of the first and second embodiments, the license/model management apparatuses are such that, when receiving a model verification request after the start of operation at the user apparatus, test data corresponding to the model with dummy data mixed therewith is transmitted to the user apparatus as the requester, and when receiving output data as a result of inputting the transmitted data to the user model to execute a task, output data for the test data is extracted to compare the output data with an output value by the stored normal test data-trained model in order to detect whether the user model is fraudulent or not based on the determination criteria. Therefore, even when the model itself is not sent and received, there is an advantage of being able to detect the falsification of the model.

Further, accord in to the machine-learning model fraud detection systems and fraud detection methods of the first and second embodiments, the license/model management apparatuses are such that a licensor, a model, and a user are associated with one another based on a license issuance request and a model registration request from the licensor, and individual license information linked to appropriate terms of use is generated and stored. Then, when an application for use is provided from the user apparatus, the individual license information is referred to determine whether the application for use is appropriate or not. When the application for use is not appropriate, since the use is prohibited, there is an advantage of being able to prevent unauthorized use.

In the first and second fraud detection systems, when detecting fraud of a model, a specific criteria range may be stored as determination criteria for each test data to compare output data of the model to be verified with respect to the test data, rather than to compare an output value of a normal test data-trained model for test data with output data of the model to be verified, to determine normal or fraudulent based on the comparison result.

In this case, the criteria range is stored in association with each corresponding normal/fraudulent determination.

Suppose further that the licensor is sufficiently credible in this case, the license/model management apparatus can be configured to receive, from the licensor apparatus, and store test data and a corresponding output value, or test data and a corresponding criteria range, so that when receiving the model verification request from the user apparatus, the license/model management apparatus will compare output data of the model to be verified with the stored output value (or criteria range) to make the normal/fraudulent determination of the model to be verified.

In the case of such a configuration, there is an advantage of being able to further simplify the configuration of the license/model management apparatus.

The test data-trained model is distributed to the user apparatus in the form of a program, but the test data-trained model may be distributed as hardware with the model on a chip. A user may further implement the chip into various products (for example, cameras, cars, and the like) to use the model in these products.

Even in this case, each product with the model implemented therein can be connected to the user apparatus or the license/model management apparatus through a network to verify the model as described above.

Upon verification in the model verification unit, the model class 22 and the layer class 26 of the management information illustrated in FIG. 2 may be referred to compare the model to be verified with the normal model so as to determine whether the values of all parameters or these hash values match with one another in order to make the fraud determination based on the results.

The parameters or these hash values can be used for determination together with the output data with respect to the test data.

For example, when the output data with respect to the test data falls within the tolerable range regardless of the fact that the parameters or the hash values do not exactly match, there is a possibility that the model to be verified may be modified or used in another system such as relearning or transfer learning. Therefore, the model verification unit is configured to determine fraud in such a case.

Further, in the first fraud detection system, only parameters completely describing the model or these hash values, and test data corresponding to the model may be registered in the license/model management apparatus in response to the model registration request without registering the pre-trained model itself.

In this case, the license/model management apparatus requests the licensor apparatus to provide an encrypted or packaged model dedicated to an individual license corresponding to the model. Then, the license/model management apparatus receives a pre-trained model to perform learning using test data.

Further, in the above-described example, model verification is performed by the license/model management apparatus alone, hut the owner apparatus or the user apparatus may also be configured to include the model verification function.

INDUSTRIAL APPLICABILITY

The present invention relates to a machine-learning model fraud detection system and fraud detection method for detecting the unauthorized use or falsification of a machine learning model.

DESCRIPTION OF REFERENCE NUMERALS

11, 31 . . . license management unit, 12 . . . model management unit, 13, 33 . . . model verification unit, 21 . . . licensor class, 22 . . . model class, 23 . . . user class, individual license class, 25 . . . fraud detection data class, 26 . . . layer class, 27 . . . user registration information class, 32 . . . model generation unit, 41 . . . first license/model management apparatus, 42 . . . user apparatus, 43, 45 . . . licensor apparatus, 44 . . . second license/model management apparatus, 104, 304 . . . input interface, 105, 305 . . . main control unit, 106, 306 . . . output interface, 107, 307 . . . management information holding unit, 108, 309 . . . fraud detection data holding unit, 109, 311 . . . model holding unit, 110, 312 . . . model learning unit, 112, 312 . . . task execution unit, 113, 313 . . . fraud determination unit, 310 . . . training data holding unit

The invention claimed is:

1. A machine-learning model fraud detection system configured to detect fraud on a model built by machine learning, comprising,
  a license/model management apparatus configured to include:
    a license manager configured to manage license information, model information; and user information in response to a license issuance request from a licensor apparatus, and refers to the user information in response to usage registration from a user apparatus to determine an unauthorized user;
    a model manager including:
      a model holder configured to store a first learned model provided from the licensor apparatus;
      model learning processor circuitry configured to learn the first learned model from test data provided from the licensor apparatus to generate a second learned model; and
      a fraud detection data holder configured to store the test data and stores an output value obtained when the test data is executed in the second learned model; and
    model verification processor circuitry including:
      task execution processor circuitry configured to input the test data, stored in the fraud detection data holder, to a user model provided from the user apparatus using the second learned model for task execution; and
      fraud determination processor circuitry configured to compare output data of the task execution processor circuitry with the output value stored in the fraud detection data holder to determine whether the user model is fraudulent or not.

2. A machine-learning model fraud detection system configured to detect fraud on a model built by machine learning, comprising:
  a license/model management apparatus configured to include:
    a license manager configured to manage license information, model information, and user information in response to a license issuance request from a licensor apparatus, and refers to the user information in response to usage registration from a user apparatus to determine an unauthorized user;
    a model generator including:
      a training data holder configured to store training data, a test data generator configured to generate test data used to detect fraud;
      model learning processor circuitry configured to generate a learned model from an untrained model provided from the licensor apparatus using the training data and the test data;

a model holder configured to store the learned model; and a fraud detection data holder configured to store the test data and an output value obtained when the test data is executed in the learned model; and model verification processor circuitry including:

task execution processor circuitry configured to input the test data, stored in the fraud detection data holder, to a user model provided from the user apparatus using the learned model for task execution; and fraud determination processor circuitry configured to compare output data of the task execution processor circuitry with the output value stored in the fraud detection data holder to determine whether the user model is fraudulent or not.

3. The machine-learning model fraud detection system according to claim 1, wherein when receiving a test data transmission request from the user apparatus using the second learned model, the license manager is configured to read the test data from the fraud detection data holder and is configured to transmit the test data including dummy data to the user apparatus, and the fraud determination processor circuitry of the model verification processor circuitry is configured to input output data obtained by executing the test data in a user model in the user apparatus, and is configured to compare the output data with the output value stored in the fraud detection data holder to determine whether the user model is fraudulent or not.

4. The machine-learning model fraud detection system according to claim 2, wherein when receiving a test data transmission request from the user apparatus using the learned model, the license manager is configured to read the test data from the fraud detection data holder and is configured to transmit the test data including dummy data to the user apparatus, and the fraud determination processor circuitry of the model verification processor circuitry is configured to input output data obtained by executing the test data in a user model in the user apparatus, and is configured to compare the output data with the output value stored in the fraud detection data holder to determine whether the user model is fraudulent or not.

5. The machine-learning model fraud detection system according to claim 1, wherein the fraud determination processor circuitry of the model verification processor circuitry is configured to determine that the user model is not fraudulent when a difference is in a predefined tolerable range as a result of comparing output data obtained by inputting test data to the user model provided from the user apparatus, or output data input from the user apparatus, with the output value stored in the fraud detection data holder.

6. The machine-learning model fraud detection system according to claim 2, wherein the fraud determination processor circuitry of the model verification processor circuitry is configured to determine that the user model is not fraudulent when a difference is in a predefined tolerable range as a result of comparing output data obtained by inputting test data to the user model provided from the user apparatus, or output data input from the user apparatus, with the output value stored in the fraud detection data holder.

7. The machine-learning model fraud detection system according to claim 3, wherein the fraud determination processor circuitry of the model verification processor circuitry is configured to determine that the user model is not fraudulent when a difference is in a predefined tolerable range as a result of comparing output data obtained by inputting test data to the user model provided from the user apparatus, or output data input from the user apparatus, with the output value stored in the fraud detection data holder.

8. The machine-learning model fraud detection system according to claim 4, wherein the fraud determination processor circuitry of the model verification processor circuitry is configure to determine that the user model is not fraudulent when a difference is in a predefined tolerable range as a result of comparing output data obtained by inputting test data to the user model provided from the user apparatus, or output data input from the user apparatus, with the output value stored in the fraud detection data holder.

9. The machine-learning model fraud detection system according to claim 1, wherein the fraud determination processor circuitry of the model verification processor circuitry is configured to determine that the user model is fraudulent when output data falls within a criteria range used to identify fraud as a result of comparing output data obtained by inputting test data to the user model provided from the user apparatus, or output data input from the user apparatus, with the criteria range.

10. The machine-learning model fraud detection system according to claim 2, wherein the fraud determination processor of the model verification processor circuitry is configured to determine that the user model is fraudulent when output data falls within a criteria range used to identify fraud as a result of comparing output data obtained by inputting test data to the user model provided from the user apparatus, or output data input from the user apparatus, with the criteria range.

11. The machine-learning model fraud detection system according to claim 3, wherein the fraud determination processor circuitry of the model verification processor circuitry is configured to determine that the user model is fraudulent when output data falls within a criteria range used to identify fraud as a result of comparing output data obtained by inputting test data to the user model provided from the user apparatus, or output data input from the user apparatus, with the criteria range.

12. The machine-learning model fraud detection system according to claim 4, wherein the fraud determination processor circuitry of the model verification processor circuitry is configured to determine that the user model is fraudulent when output data falls within a criteria range used to identify fraud as a result of comparing output data obtained by inputting test data to the user model provided from the user apparatus, or output data input from the user apparatus, with the criteria range.

13. A machine learning model fraud detection method as a method of detecting fraud on a model built by machine learning, comprising:

causing a license manager to manage license information, model information, and user information in response to a license issuance request from a licensor apparatus;

causing the license manager to receive a first learned model and test data provided from the licensor apparatus;

causing model holding processor circuitry of a model manager to store the first learned model and causing a fraud detection data holder to store the test data;

causing model learning processor circuitry of the model manager to learn the first learned model so that a singular output value can be obtained when the test data is input so as to generate a second model, and store, in the fraud detection data holder, the output value obtained when the test data is input to the second learned model and executed;

causing the license manager to distribute the second learned model to a user apparatus according to the license information;

causing the license manager to refer to the user information in response to usage registration from the user apparatus to determine an unauthorized user, and receive a user model used by the user apparatus in response to a model verification request from the user apparatus;

causing task execution processor circuitry of model verification processor circuitry to input test data, stored in the fraud detection data holder, to the user model for task execution; and causing fraud determination processor circuitry of the model verification processor circuitry to compare output data; obtained by executing the model in the task execution processor circuitry, with the output value stored in the fraud detection data holder so as to determine whether the user model is fraudulent or not.

14. The machine learning model fraud detection method according to claim 13, wherein when receiving a test data transmission request from the user apparatus using the second learned model, the license manager reads the test data from the fraud detection data holder and transmits the test data including dummy data to the user apparatus, and the fraud determination processor circuitry of the model verification processor circuitry inputs output data obtained by executing the test data in a user model in the user apparatus, and compares the output data with the output value stored in the fraud detection data holder to determine whether the user model is fraudulent or not.

* * * * *